(12) United States Patent
Hansal et al.

(10) Patent No.: US 11,549,194 B2
(45) Date of Patent: Jan. 10, 2023

(54) ELECTROPOLISHING METHOD AND ELECTROLYTE FOR SAME

(71) Applicant: HIRTENBERGER ENGINEERED SURFACES GMBH, Hirtenberg (AT)

(72) Inventors: Wolfgang Hansal, Markt Piesting (AT); Selma Hansal, Markt Piesting (AT); Gabriela Sandulache, Berndorf (AT)

(73) Assignee: Hirtenberger Engineered Surfaces GMBH, Hirtenberg (AT)

( * ) Notice: Subject to any disclaimer, the term of this patent is extended or adjusted under 35 U.S.C. 154(b) by 16 days.

(21) Appl. No.: 16/467,206

(22) PCT Filed: Dec. 7, 2017

(86) PCT No.: PCT/AT2017/060326
§ 371 (c)(1),
(2) Date: Jul. 23, 2019

(87) PCT Pub. No.: WO2018/102845
PCT Pub. Date: Jun. 14, 2018

(65) Prior Publication Data
US 2020/0080222 A1    Mar. 12, 2020

(30) Foreign Application Priority Data

Dec. 9, 2016 (AT) .............................. A 51119/2016
Aug. 29, 2017 (AT) .............................. A 50716/2017

(51) Int. Cl.
*C25F 3/16* (2006.01)
*C25F 3/20* (2006.01)
*C25F 3/26* (2006.01)

(52) U.S. Cl.
CPC ................. *C25F 3/16* (2013.01); *C25F 3/20* (2013.01); *C25F 3/26* (2013.01)

(58) Field of Classification Search
CPC ................. C25F 3/16; C25F 3/20; C25F 3/26
USPC ......................................... 205/674–680, 682
See application file for complete search history.

(56) References Cited

U.S. PATENT DOCUMENTS

| | | | |
|---|---|---|---|
| 3,974,357 | A | 8/1976 | Saito et al. |
| 4,713,516 | A | 12/1987 | Buhler et al. |
| 5,126,525 | A | 6/1992 | Kaneko |
| 5,147,995 | A | 9/1992 | Chung |
| 5,539,178 | A | 7/1996 | Taneda |

(Continued)

FOREIGN PATENT DOCUMENTS

| | | |
|---|---|---|
| DE | 24 12 091 C2 | 9/1983 |
| DE | 33 02 011 C | 6/1984 |

(Continued)

OTHER PUBLICATIONS

International Search Report issued in PCT/AT2017/060326 dated Feb. 13, 2018.

(Continued)

*Primary Examiner* — Brian W Cohen
(74) *Attorney, Agent, or Firm* — Workman Nydegger

(57) ABSTRACT

The invention relates to an electrolyte for electropolishing metal surfaces, said electrolyte comprising methanesulphonic acid and additionally at least one phosphonic acid, as well as to an electropolishing method for same.

13 Claims, 3 Drawing Sheets

(56) References Cited

U.S. PATENT DOCUMENTS

| | | | |
|---|---|---|---|
| 7,807,039 B2* | 10/2010 | Piesslinger-Schweiger | ................ C25F 3/26 205/678 |
| 8,080,148 B2 | 12/2011 | Piesslinger-Schweiger et al. | |
| 2003/0132416 A1* | 7/2003 | Boguslavsky | ......... H05K 3/067 252/2 |
| 2008/0099345 A1 | 5/2008 | Piesslinger-Schweiger et al. | |
| 2008/0121530 A1 | 5/2008 | Piesslinger-Schweiger et al. | |
| 2008/0217186 A1 | 9/2008 | Bohme et al. | |
| 2009/0261068 A1* | 10/2009 | Kool | .......... C25F 5/00 216/104 |
| 2011/0198227 A1* | 8/2011 | Martyak | ................. C25D 3/02 205/103 |
| 2011/0220615 A1 | 9/2011 | Yamada | |
| 2011/0303553 A1 | 12/2011 | Inman | |
| 2013/0092557 A1* | 4/2013 | Wong | ....................... C25F 3/26 205/684 |
| 2016/0093898 A1 | 3/2016 | Gould | |

FOREIGN PATENT DOCUMENTS

| | | |
|---|---|---|
| DE | 34 19 945 C1 | 11/1985 |
| DE | 102006047713 | 3/2008 |
| DE | 10 2006 045 221 B3 | 4/2008 |
| DE | 10 2006 053 586 B3 | 4/2008 |
| DE | 10 2006 050 317 B3 | 6/2008 |
| DE | 10 2007 011 632 B3 | 6/2008 |
| EP | 2878713 | 6/2015 |
| WO | WO 2015/078930 A1 | 6/2015 |

OTHER PUBLICATIONS

AT Search Report cited in A 50716/2017, dated Feb. 16, 2018.
AT Search Report cited in A 51119 2016, dated Jun. 6, 2017.
Written Opinion cited in PCT/AT2017/060326, dated Feb. 13, 2018.

* cited by examiner

ELECTROPOLISHING METHOD AND ELECTROLYTE FOR SAME

The invention relates to an electrolyte for electropolishing metal surfaces, in particular parts made of metal powder by means of an additive method, wherein the electrolyte contains methanesulfonic acid, as well as a method therefor.

The additive manufacture of metal parts ("3D printing") is a relatively new technology which is used more and more frequently in the design of components due to its significantly enhanced flexibility in comparison to conventional manufacturing methods. The principle of said manufacturing method is to sinter or to melt a metal powder applied in layers by means of laser or electron beam in a controlled fashion. At the end, the finished component is embedded in the metal powder.

The surfaces of components manufactured in this manner exhibit process-related ripples and roughnesses, which are due to the grain size of the metal powder used, the layer thickness used for the construction and the beam geometry of the employed energy beam. This fact considerably impedes the practical use of parts produced in this manner in technology. A conventional mechanical post-machining of 3D-printed parts is usually either not economical or virtually impossible to perform due to the complex geometry of the component.

Although electropolishing methods according to the prior art are suitable for levelling roughnesses in the single-digit to low double-digit micrometer range (in this case, the removal typically ranges from 10 µm to 40 µm), they regularly fail at the roughnesses occurring in 3D printing, which extend into the tenth of a millimetre range.

DE 10 2006 053 586 B3 describes such an electropolishing method in which an electrolyte of the initially mentioned kind is used.

SUMMARY

It is therefore the object of the invention to eliminate the disadvantages of the known electropolishing methods and, in particular, to provide an electrolyte which allows for a surface treatment of parts made of metal powder by means of an additive method.

According to the invention, this object is achieved by an electrolyte of the initially mentioned kind in that, additionally, at least one phosphonic acid is contained in the electrolyte.

DETAILED DESCRIPTION

Figure 1:
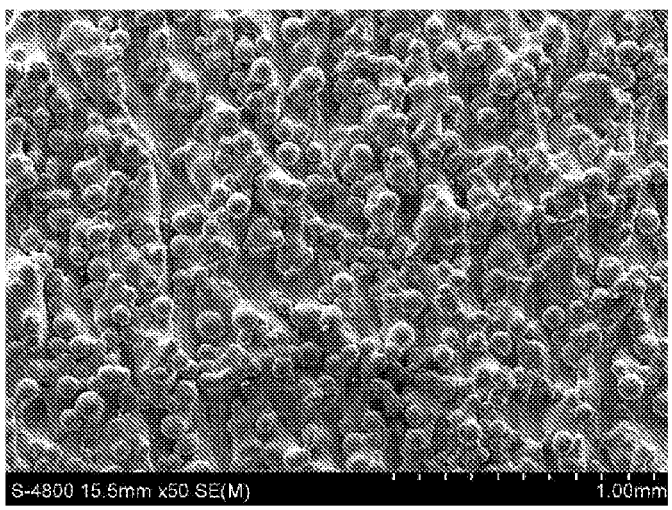
FIG. 1 shows an SEM image of the surface area of a component before implementation of the method according to a first embodiment to the invention.

The electrolyte according to the invention is capable of levelling out major roughnesses that arise as a result of the 3D printing process. Of course, the electrolyte according to the invention can also be used in the post-machining of conventionally produced metal components. Above all, it is suitable for the post-machining of components made of titanium alloys, and with a suitable variation of the composition, the machining of aluminium alloys is possible as well.

In this connection, it is provided according to the invention that the at least one phosphonic acid is selected from a group comprising mono-, di- and/or polyphosphonic acids, preferably amino-tris(methylenephosphonic acid) or mixtures thereof.

Tests conducted by the inventors have shown that, especially for components made of titanium alloys, excellent results are obtained for their residual surface roughness, if the at least one phosphonic acid is contained at a concentration of from 0.1% by weight to 10% by weight.

Especially in the application for 3D-printed parts, it is of particular advantage if, in addition, at least one polyvalent alcohol, preferably comprising at least three, particularly preferably more than three functional hydroxy groups and/or at least one polyalcohol is contained in the electrolyte according to the invention, wherein the alcohol is preferably selected from a group comprising glycol, glycerin, polyvinyl alcohol, inositol or sorbitol or mixtures thereof. It has been shown that those alcohols, as complexing agents, wetting agents and viscosity modifiers, significantly influence the levelling effect. In particular, this effect increases as the number of functional hydroxy groups of the employed alcohol rises. Mixtures of different alcohols can also be used.

Usually, the at least one alcohol is contained in the electrolyte according to the invention at a concentration of up to 10% by weight.

Depending on the surface and the material of the component to be treated, further additives are contained in the electrolyte according to the invention. In this case, further additives are used in particular which are selected from a group comprising mineral acids, in particular phosphoric acid and sulfuric acid, fluorides, in particular ammonium hydrogen difluoride, and amines, in particular ethanolamines and isopropanolamines. In this case, the mineral acids are usually contained at a concentration of up to 50% by weight in the electrolyte, the fluorides at a concentration of up to 20% by weight, and the amines at a concentration of up to 15% by weight.

The electrolyte according to the invention is used in particular for the post-machining of parts made of metal powder, in particular of titanium and aluminium alloys, by means of an additive method.

Furthermore, the electrolyte according to the invention is suitable in particular for an electropolishing method for metal components produced in 3D printing, wherein at least one component to be machined functions as a first electrode and at least one second electrode is provided as a counter electrode, and at least a partial removal of a portion of the component surface occurs in an electrolyte bath with the electrolyte according to the invention. In this connection, the current is applied according to the invention in the form of repeating pulse sequences, wherein at least one anodic pulse is provided, the current intensity of which displays a steady increase over the course of time up to a specifiable value, wherein the increase is preferably linear, non-linear or exponential. Hence, this anodic pulse does not display a rectangular shape, as it is conventional in the prior art, but its current intensity increases in the course of the pulse duration so that no sudden, but a steady increase in the current intensity in the form of a non-linear slope or a linear ramp over the pulse duration is obtained.

The pulse shape, in particular the speed of the increase and, if applicable, the drop of the current, are responsible for the time course of the formation and the degradation of the polishing film. By selectively controlling the time course of the pulse slope, this essential part of the polishing process can be performed optimally. By controlling the temporal structure of the polishing film, it becomes possible to pass through the areas etching—passivation—polishing during electropolishing in a planned and reproducible manner and, thus, to selectively control the material removal. For metal parts with high roughness, the etching phase can thus be extended by a slowly rising ramp or, respectively, a stepped pulse, thus shortening the process time and improving the result.

In a preferred embodiment of the invention, the pulse displays micropulses subsequent to the increase. In this case, higher-frequency micropulses are "superimposed" on the pulse, the so-called base pulse. The effect of those micropulses is that the polishing process is accelerated, since those micropulses have a disproportionately strong impact at tips and edges in those places due to the field line concentration. In this way, the local current distribution across the workpiece is furthermore influenced as a function of the frequency of the micropulses, which, in turn, is essential for the smoothing effect of the method according to the invention.

Since the electrolytic double-layer capacitance has locally different values on a rough and chemically inhomogeneous surface, as it is usually provided, for example, in a 3D-printed part, the distribution of the current at higher frequencies is different than at lower ones. The reason for this is that the effective resistance of a capacitance decreases as the frequency of the applied current increases so that the higher-frequency portions of the current pulse flow preferentially over places of high capacitance, while the low-frequency portion flows through areas having a low polarization resistance. Thus, the local current distribution on the workpiece can be influenced significantly by the pulse shape.

According to the invention, it is preferably provided that at least one second anodic pulse adjoins the at least one anodic pulse, wherein the at least second pulse is equal to or different from the first pulse, and preferably at least two consecutive anodic pulses and/or pulse sequences are interrupted by a pulse pause and/or by at least one cathodic pulse. Those pulse sequences may exhibit the same or different repeating pulses. In this connection, it is essential that at least one anodic pulse exhibits the steady increase according to the invention.

In a further embodiment of the invention, the pulse frequency may vary with the duration of the method according to the invention due to the progressive smoothing of the component. In this case, the control of the frequency is another influencing value for controlling the removal rate in case of an inhomogeneous initial roughness and usually ranges between 0.2 and 2000 Hz.

Overall, it should be noted that the control of the current or, respectively, voltage signal of the pulses as well as the control of pulse lengths, pulse slopes and pulse pause phases allow the polishing effect to be controlled. In this case, the effect of the pulse slopes is based, on the one hand, on the temporal structure of the effective polishing film, which is controlled by the ramp steepness, and, on the other hand, on the varying frequency spectrum of the pulses that are used.

In this connection, it is provided, depending on the application, that the pulses have an average current density of 0.5 $A/dm^2$ to 30 $A/dm^2$ and the pulses and/or the pulse pauses have a pulse length of 0.0005 s to 5 s.

Furthermore, the electrolyte may contain additional additives, in particular wetting agents, inhibitors and/or complexing agents. It may also be provided that the electrolyte or the workpiece is moved periodically or continuously.

In the method according to the invention, it is in particular provided that inert cathodes, in particular steel cathodes or stainless-steel cathodes, are used as counter electrodes.

The invention will be explained in further detail below on the basis of non-limiting exemplary embodiments. Percentages are herein understood as percent by weight, unless otherwise specified.

In preparation for the electrochemical post-machining of 3D-printed parts, a mechanical cleaning, for example by blasting or shot peening, is carried out in a first step in order to remove metal powder not attached to the component, which metal powder adheres loosely or, respectively, has accumulated in cavities and undercuts.

After this cleaning step, the component is mechanically fixed at a suitable location, electrically contacted, dipped into the electrolyte according to the invention and anodically loaded according to an electrochemical method adapted to the material and the geometry of the component.

In doing so, the concentrations of the individual components of the electrolyte are adjusted such that a predefined final roughness of the component surface is achieved.

Depending on the requirement, the current that is used can be a direct current, a unipolar pulse current or a bipolar reverse pulse current. The combination of different methods is possible as well.

The bath temperature is between 20° C. and 75° C. and is also adapted to the workpiece to be treated.

An improvement of the results is achieved if an agitation of the electrolyte by pumping and/or stirring is provided in order to achieve an effective electrolyte circulation in places where the largest removal is to occur.

EXAMPLE 1

Post-Treatment of a 3D-Printed Component Made of Ti6Al4V

A 3D-printed component for technical applications made of the titanium alloy Ti6Al4V is removed from the 3D printer, mechanically pre-cleaned and electrically contacted. Subsequently, the component is treated for 30 minutes in an electrolyte bath consisting of 98% methanesulfonic acid, 2% amino-tris(methylenephosphonic acid) at a temperature of 50° C., at an average voltage of 20 V and at an average current density of 12.5 $A/dm^2$ using a pulse current. Subsequently, the component is rinsed with deionized water and dried by means of compressed air.

Figure 2:
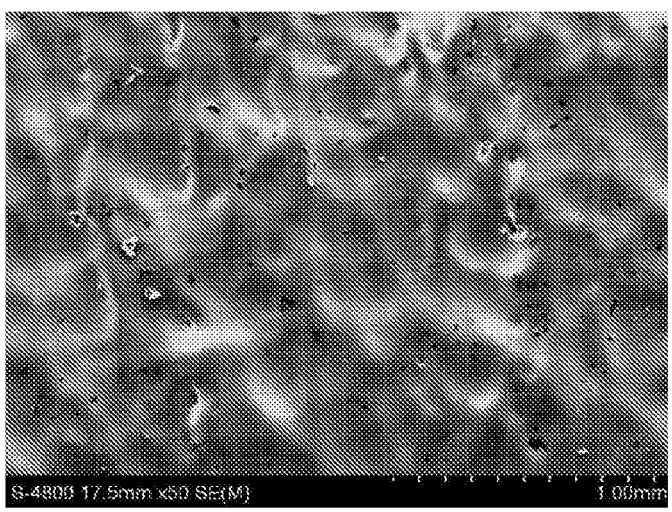
FIG. 2 shows the surface of the component of FIG. 1 after the implementation of the method according to the invention.

In FIG. 1, an SEM image of a surface area of the component is depicted before the implementation of the method according to the invention as described above. FIG. 2 shows this surface after the implementation of the method according to the invention. In this case, the Ra value of 15 µm is reduced to 3 µm after the post-treatment according to the invention.

EXAMPLE 2

Post-Treatment of a 3D-Printed Component Made of AlMgSi10

After mechanical cleaning and electrical contacting, a 3D-printed component made of the alloy AlMgSi10 with high silicon content is smoothed for 40 minutes in an electrolyte consisting of 4.4% methanesulfonic acid, 45.6% phosphoric acid, 32.7% sulfuric acid, 4.5% triethanolamine, 0.4% amino-tris(methylenephosphonic acid) and 12.4% ammonium hydrogen difluoride at a voltage of 18 V and a current density of 4 A/dm$^2$. Subsequently, the component is rinsed with deionized water and dried by means of compressed air.

Figure 3:
FIG. 3 shows an SEM image of the surface area of a component before implementation of the method according to a second embodiment to the invention.
Figure 4:
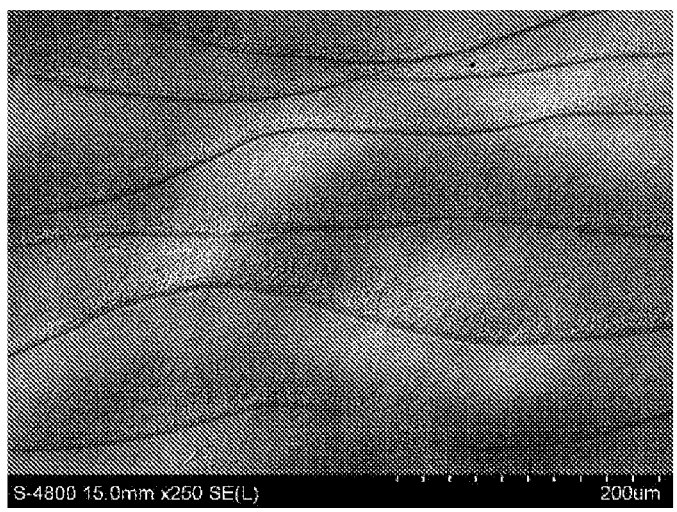
FIG. 4 shows the surface of the component of FIG. 3 after the implementation of the method according to the invention.

FIG. 3 and FIG. 4 again show an SEM image of the surface of the component before and, respectively, after the implementation of the method according to the invention, wherein the determined Ra value has decreased from 1.4 µm to 0.3 µm.

EXAMPLE 3

Post-Treatment of a 3D-Printed Component Made of Ti6Al4V

A 3D-printed component for technical applications made of the titanium alloy Ti6Al4V is removed from the 3D printer, mechanically pre-cleaned and electrically contacted. Subsequently, the component is treated for 30 minutes in an electrolyte bath consisting of 98% methanesulfonic acid, 1.5% amino-tris(methylenephosphonic acid) and 0.5% inositol at a temperature of 45° C., at an average voltage of 20 V and at an average current density of 5 A/dm$^2$ using a pulse current. Subsequently, the component is rinsed with deionized water and dried by means of compressed air.

Figure 5:
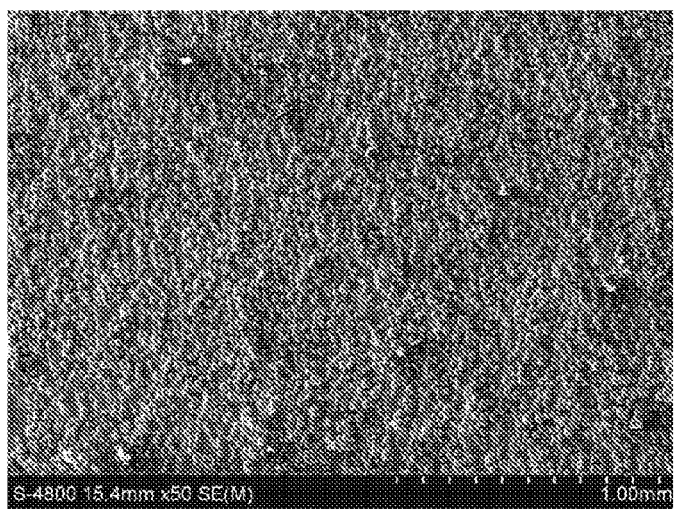
FIG. 5 shows an SEM image of the surface area of a component before implementation of the method according to a third embodiment to the invention.
Figure 6:
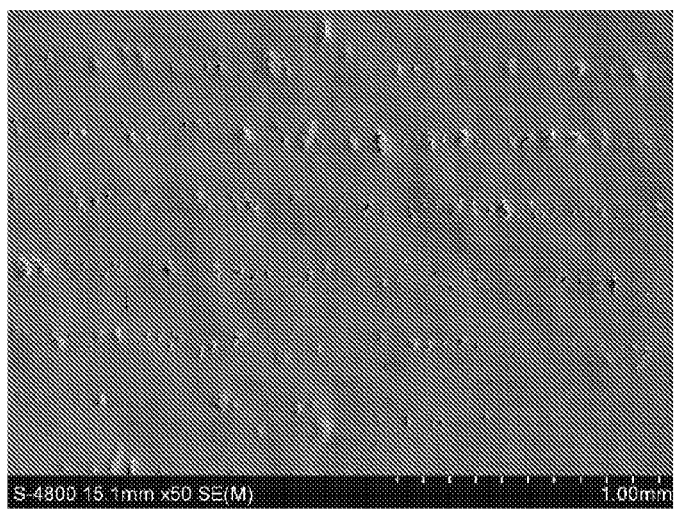
FIG. 6 shows the surface of the component of FIG. 5 after the implementation of the method according to the invention.

The surface of the component is shown in FIG. 5, and it has an Ra value of 15 µm. After the treatment of the component in the manner as described above by the method according to the invention, the Ra value was only 3 µm. In FIG. 6, the smoothing of the surface of the component treated according to the invention is evident.

EXAMPLE 4

Post-Treatment of a 3D-Printed Component Made of Ti6Al4V

After mechanical cleaning and electrical contacting, a 3D-printed component for medical applications is smoothed for 60 minutes in an electrolyte consisting of 90% methanesulfonic acid, 1.5% 1-hydroxyethane-(1,1-diphosphonic acid), 3% amino-tris(methylenephosphonic acid) and 5.5% glycol at a voltage of 22 V and a current density of 10 A/dm$^2$ using a direct current. Subsequently, the component is rinsed with deionized water and dried by means of compressed air.

Figure 7:
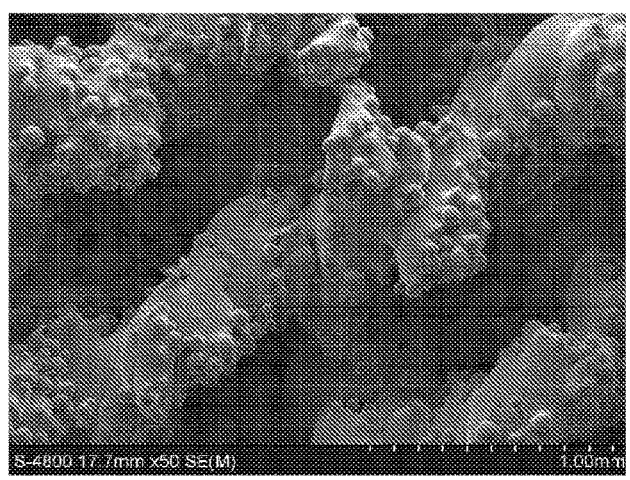
FIG. 7 shows an SEM image of the surface area of a component before implementation of the method according to a fourth embodiment to the invention.
Figure 8:
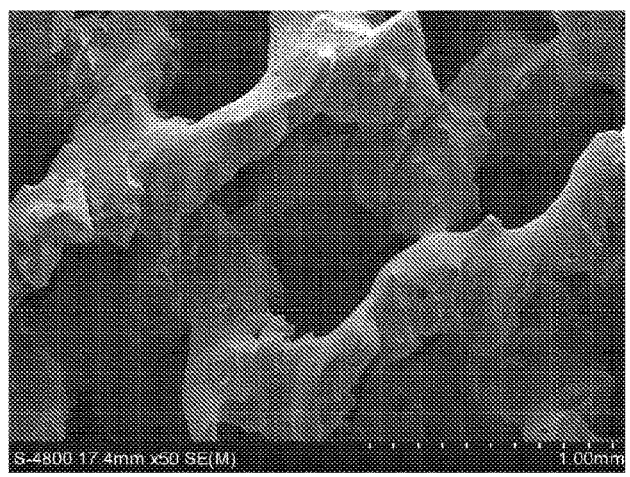
FIG. 8 shows the surface of the component of FIG. 7 after the implementation of the method according to the invention.

As shown in FIG. 7 in an SEM image of the surface, this component has a lattice-like structure, the roughness of which is caused by powder residues from 3D printing which adhere to the surface. After the treatment by means of the method according to the invention, those particle residues are removed virtually completely (FIG. 8).

Figure 9:
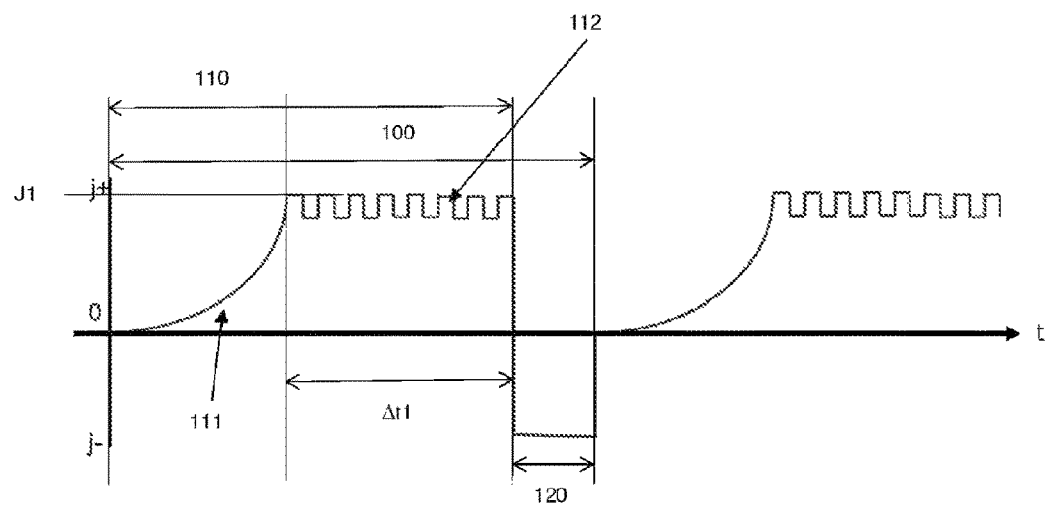
FIG. 9 shows a typical pulse sequence of the current in an electropolishing method according to the invention.

In FIG. 9, a typical pulse sequence of 100 is illustrated which, according to the invention, comprises an anodic pulse 110, the current intensity j+ of which displays a steady increase 111 over the course of time up to a specifiable value J1. This anodic pulse 110 maintained over a certain time Δt1 is superimposed with micropulses 112, i.e., higher-frequency multipulses. A cathodic pulse 120 in rectangular shape adjoins this anodic pulse 110.

This pulse sequence 100 consisting of an anodic pulse 110 and a cathodic pulse 120 is repeated until the desired removal and, associated therewith, the desired surface quality are achieved. The duration and magnitude of the steady increase 111, namely the slope or, respectively, ramp, depends on the initial roughness and the consequent necessary etching time. Number and height of the micropulses 112 are material-dependent.

EXAMPLE 5

Smoothing of a Component Made of a Titanium Alloy (Ti6Al4V)

The 3D-printed component with an initial roughness of Ra=20 µm made of a titanium alloy is treated as follows:
Cleaning of the component, especially degreasing and rinsing
Deburring by means of electrochemically supported etching and another rinsing
Smoothing of the surface of the component using the method according to the invention:
In this case, the anodic pulse consists of a ramp with a current density of 0 to 5 A/dm$^2$ and rising and a subsequent pulse pattern of 5 A/dm$^2$ and 20 A/dm$^2$ at a frequency of 2 Hz.
The electrolyte consists of:
98% methanesulfonic acid
1% amino-tris(methylenephosphonic acid)
1% water
The temperature of the electrolyte bath is 50° C.
Rinsing
Drying
The roughness of the machined component is reduced by this surface treatment to Ra=1.8 µm. The resulting surfaces meet the requirement with regard to the surface roughness for the given application, further machining is not required therefor. However, depending on the application, a further functionalization of the surface may occur.

The invention claimed is:
1. An electrolyte for electropolishing metal surfaces, wherein the electrolyte comprises methanesulfonic acid, at least one phosphonic acid, at least one mineral acid at a concentration of up to 50% by weight and selected from phosphoric acid or sulfuric acid, at least one fluoride at a concentration of up to 20% by weight, wherein the at least one fluoride comprises ammonium hydrogen difluoride, and at least one of a polyalcohol or amine.
2. An electrolyte according to claim 1, wherein the at least one phosphonic acid is selected from the group consisting of mono-, di-, and polyphosphonic acids and mixtures thereof.

3. An electrolyte according to claim 1, wherein the at least one phosphonic acid is contained at a concentration of from 0.1% by weight to 10% by weight.

4. An electrolyte according to claim 1, wherein the polyalcohol is contained at a concentration of up to 10% by weight.

5. An electrolyte according to claim 1, wherein the amine is included at a concentration of up to 15% by weight.

6. An electrolyte according to claim 1, wherein the electrolyte contains one or more additional components selected from one or more additives, one or more inhibitors, or one or more complexing agents.

7. An electrolyte according to claim 2, wherein the at least one polyphosphonic acid comprises amino-tris(methylene-phosphonic acid).

8. An electrolyte according to claim 1, wherein the amine is selected from the group consisting of ethanolamines and isopropanolamines.

9. An electrolyte according to claim 6, wherein the one or more additional additives comprise a wetting agent.

10. An electrolyte for electropolishing metal surfaces, wherein the electrolyte comprises methanesulfonic acid, at least one phosphonic acid, at least one mineral acid at a concentration of up to 50% by weight and selected from phosphoric acid or sulfuric acid, and at least one fluoride at a concentration of up to 20% by weight, wherein the at least one fluoride comprises ammonium hydrogen difluoride.

11. An electrolyte according to claim 10, wherein the electrolyte further comprises at least one amine selected from the group consisting of ethanolamines and isopropanolamines and at least one polyalcohol.

12. An electrolyte according to claim 11, wherein the at least one polyalcohol is selected from the group consisting of ethylene glycol, glycerin, polyvinyl alcohol, inositol, sorbitol, and mixtures thereof.

13. An electrolyte for electropolishing metal surfaces, wherein the electrolyte comprises methanesulfonic acid, at least one phosphonic acid, at least one mineral acid at a concentration of up to 50% by weight and selected from phosphoric acid or sulfuric acid, at least one fluoride at a concentration of up to 20% by weight, and at least one amine selected from the group consisting of ethanolamines and isopropanolamines, wherein the at least one fluoride comprises ammonium hydrogen difluoride.

\* \* \* \* \*